Jan. 18, 1938.  A. VIGNE  2,105,871
OIL AND DUST SEAL FOR JOURNAL BOXES
Filed March 20, 1936
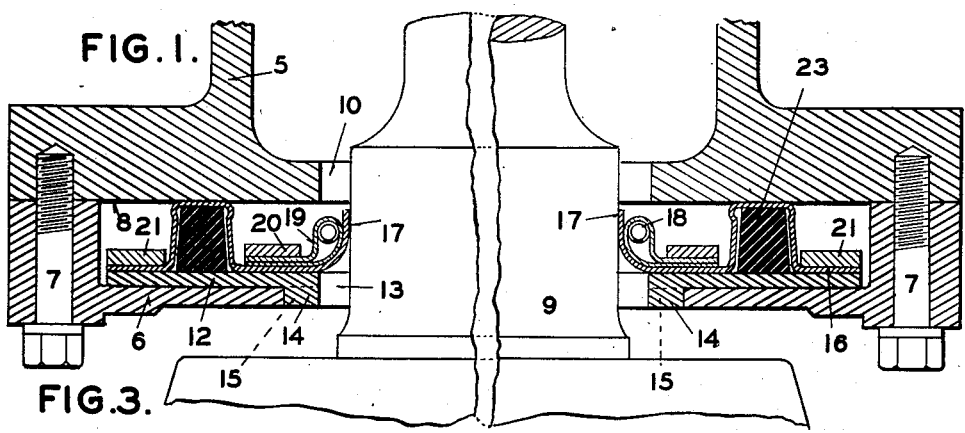
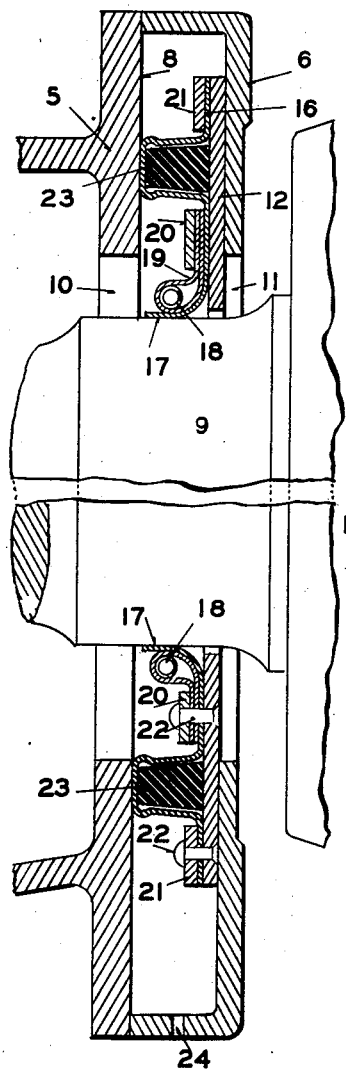
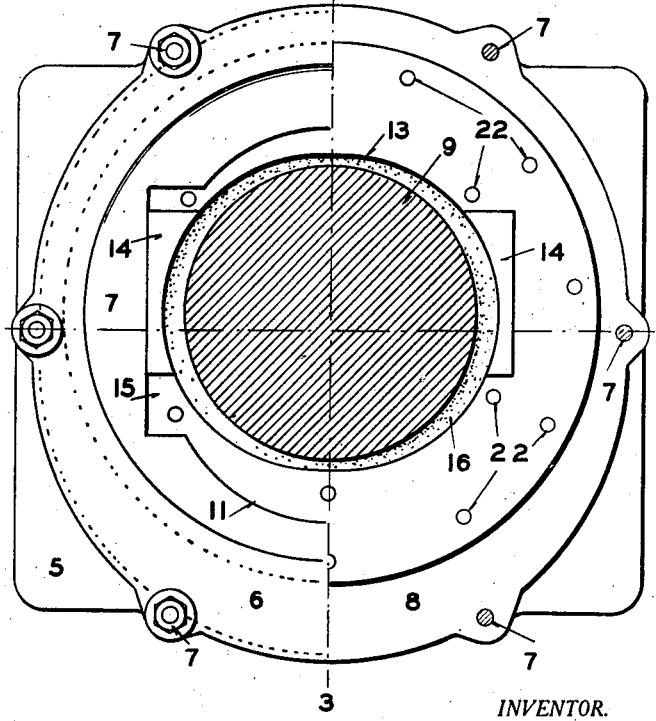
INVENTOR.
ALBERT VIGNE
BY
ATTORNEY.

Patented Jan. 18, 1938

2,105,871

UNITED STATES PATENT OFFICE 2,105,871

OIL AND DUST SEAL FOR JOURNAL BOXES

Albert Vigne, Webster Groves, Mo., assignor to National Bearing Metals Corporation, St. Louis, Mo., a corporation of New York Application March 20, 1936, Serial No. 69,750

5 Claims. (Cl. 286—6)

My invention relates to oil and dust seals for journal bearings and, in the specific form shown, is particularly adapted for use in connection with that type of journal box employed in railway rolling stock, in which type of bearing the axle has a certain amount of both vertical and horizontal movement relative to the box.

The bearings contained in railway journal boxes are lubricated by means of waste soaked oil or free oil carried in the box. A seal and dust guard is, therefore, required to prevent contamination of the lubricant by extraneous matter which would otherwise enter the box, and to prevent leakage of oil with consequent failure of proper lubrication and damage to the rolling stock. Application of an effective oil seal and dust guard to railway axle boxes is rendered difficult because of the necessary relative movement between the axle and the box, considerable vertical movement being required to permit the assembly of the grass, wedge, and other component parts of the bearing, in addition to the necessary lateral movement.

One object of my invention is to provide a seal on the axle at the back end of the journal box which will fit tightly on the axle and which has sufficient elasticity to maintain such tight fit and at the same time permit the necessary movement of the parts without damage to the seal or impairment of its function.

Another object of my invention is to provide a journal box structure including a seal unit movable on the rear surface of the journal box and to maintain an oil tight joint between said surface and unit both in running position and when the box is raised relative to the axle for inspection or replacement of parts.

A further object of my invention is to form the seal channel of the box by means of a removable cover to facilitate replacement of the sealing device and to provide means for imparting the necessary compression to the sealing device to hold it firmly against the back face of the box.

A still further object of my invention is to provide an elastic or resilient member for providing the necessary pressure of the sealing unit against the face of the box, which member is enclosed and protected by a flexible sheet of material forming the seal both with the axle and the box.

In the accompanying drawing, which illustrates one form of oil seal and dust guard made in accordance with my invention, together with a portion of a journal box and axle to which the same is affixed, Figure 1 is a horizontal section, taken on the line 1—1 of Figure 2; Figure 2 is a rear elevation, on a reduced scale, the axle being in section and half of the cover being broken away; and Figure 3 is a vertical section taken on the line 3—3 of Figure 2.

The journal box 5 differs from the usual box in having its sealing channel formed by means of a flanged cover 6 removably secured to the box by bolts 7. This construction permits of grinding or machining the rear face 8 of the box to provide a true flat surface for contact with the seal unit hereinafter to be described. The axle 9 projects through openings 10 and 11 in the rear wall of the box and the cover, respectively. These openings are considerably larger than the axle to permit of the necessary relative movement between the box and the axle. An opening 24 in the cover serves to drain off moisture and to relieve pressure between the seal unit and the box.

Seated against the inner face of the cover is a seal plate 12 made of some rigid non-abrasive metal or compound which will not damage the axle when it comes in contact therewith. The seal plate is provided with an opening 13 for passage of the axle, which opening is preferably slightly elliptical in form to permit greater horizontal than vertical movement of the axle before it contacts with the plate. Formed integral with or secured to the rear face of the seal plate are a pair of lugs 14 which engage with slots 15 in the cover plate, which slots form continuations of the opening 11. These lugs prevent rotation of the seal plate and also prevent any substantial horizontal movement of the seal plate relative to the box as they fit closely against the sides of the slots. The slots are, however, considerably longer than the lugs in order to permit of the necessary vertical movement when the box is raised or lowered.

Secured to the inner face of the sealing plate is a flexible sealing sheet 16 made of leather or other oilproof material. Formed in the sealing sheet is a central opening for the axle, which opening is of less diameter than the axle so that the inner edge of the sheet may be bent outwardly to form a sealing flange 17 contacting with the periphery of the axle. In order to hold this flange firmly against the axle and so maintain an oil-tight joint, I surround the flange with a contractile member which is preferably a coil spring 18 of the garter type. To prevent displacement of the spring it is enclosed in a sack 19 of flexible material. This sack is held in position by an inner retaining ring 20 which, together with an outer retaining ring 21, secures the sealing sheet to the sealing plate. Rivets 22 are preferably used to attach the rings to the plate. The material of the sealing sheet between the rings 20 and 21 forms an annular pocket in which is positioned an expansion ring 23 of rubber or other elastic material. In its expanded form the thickness of this ring is greater than the distance between the rear face 8 of the box and the inner face of the sealing plate so that it must be compressed when positioned, thus holding the sealing sheet firmly against the finished face 8 of the box to form a sliding oil-tight joint therewith. As the ring 23 is completely enclosed by the sealing sheet and the sealing plate, oil from the box cannot come in contact with the ring. In this way the deleterious effects of oil on rubber are avoided.

The operation of my device is as follows: When the box is jacked up, axle 9 exerts pressure on the flange 17, spring 18, and sack 19 until the sealing plate 12 comes in contact with the axle. This occurs before said parts 17, 18 and 19 have reached their elastic limits. A further movement of the box upwardly, forces the entire seal limit to slide on the finished face 8 of the box, during which movement an unbroken sealing joint is maintained between the box and the unit. The openings 10 and 11 are of such size as to limit the relative movement of the box and axle before the seal limit is reached. In the running position, any horizontal movement of the axle relative to the box is absorbed by the parts 17, 18 and 19 without disturbing the seal as this movement is limited by contact of the axle with the edge of the box opening.

Having fully described my invention, what I claim as new and desire to secure by Letters Patent of the United States is:

1. In a device of the class described, a sealing unit for use with a journal box provided with a channel and also cooperating with an axle projecting into said box through an opening of such size as to permit relative movement between the axle and box; said unit comprising a sealing plate, a flexible sealing sheet contacting with the axle throughout its periphery to form an oil seal and with a wall of the box, lugs on the sealing plate cooperating with a wall of the channel to prevent rotation of the plate, said lugs permitting relative vertical movement between the plate and box but preventing substantial horizontal movement between said parts, and an expansion member holding the sheet against a wall of the channel.

2. In a device of the class described, a sealing unit for application to the journal box and axle of a railway bearing; said unit comprising a sealing plate provided with an opening for the axle, a flexible sealing sheet contacting with the axle throughout its periphery to form an oil seal, a pair of concentric retaining rings clamping said sheet to one side of the plate, and an expansion ring of elastic material positioned between the sheet and plate intermediate the retaining rings.

3. In a device of the class described, a sealing unit for application to the journal box and axle of a railway bearing; said unit comprising a sealing plate provided with an opening for the axle, a flexible sealing sheet, a pair of concentric retaining rings clamping said sheet to one side of the plate, and an expansion ring of elastic material positioned between the sheet and plate intermediate the retaining rings, said sheet extending inwardly beyond the edge of the axle opening in the plate and provided with a flange for contact with the periphery of the axle.

4. In a device of the class described, a sealing unit for application to the journal box and axle of a railway bearing; said unit comprising a sealing plate provided with an opening for the axle, a flexible sealing sheet, a pair of concentric retaining rings clamping said sheet to one side of the plate, an expansion ring of elastic material positioned between the sheet and plate intermediate the retaining rings, said sheet extending inwardly beyond the edge of the axle opening in the plate and provided with a flange for contact with the periphery of the axle, an annular retaining sack of flexible material held in position by the inner retaining ring, and an annular contractile member within said sack for holding the flange against the periphery of the axle.

5. In a device of the class described, a sealing unit for application to the journal box and axle of a railway bearing, said box being provided with a sealing channel having outer and inner walls; said unit comprising a sealing plate provided with an opening for the axle, elastic means carried on one face of said sealing plate for forming an oil-tight joint with the inner wall of the sealing channel, and lugs on the other side of the plate engaging shoulders on the outer wall of the channel to limit the vertical movement of the unit relative to the box.

ALBERT VIGNE.